(12) United States Patent
Althubaiti

(10) Patent No.: US 12,499,256 B2
(45) Date of Patent: Dec. 16, 2025

(54) INFORMATION SECURITY THROUGH FACIAL RECOGNITION IN CONTROL CENTERS

(71) Applicant: Saudi Arabian Oil Company, Dhahran (SA)

(72) Inventor: Bashayer A. Althubaiti, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 302 days.

(21) Appl. No.: 17/712,723

(22) Filed: Apr. 4, 2022

(65) Prior Publication Data
US 2023/0315878 A1    Oct. 5, 2023

(51) Int. Cl.
  *G06F 21/62* (2013.01)
(52) U.S. Cl.
  CPC ................. *G06F 21/6209* (2013.01)
(58) Field of Classification Search
  CPC .................................................. G06F 21/6209
  See application file for complete search history.

(56) References Cited

U.S. PATENT DOCUMENTS

| | | | |
|---|---|---|---|
| 6,111,517 A | 8/2000 | Atick et al. | |
| 8,922,480 B1 | 12/2014 | Freed et al. | |
| 9,275,255 B2 | 3/2016 | Singh et al. | |
| 9,536,097 B2 | 1/2017 | Anderson et al. | |
| 10,122,757 B1* | 11/2018 | Kruse | H04L 63/10 |
| 10,169,611 B2 | 1/2019 | Buddepalli et al. | |
| 10,721,443 B1* | 7/2020 | Assani | G06V 40/172 |
| 2015/0070516 A1 | 3/2015 | Shoemake et al. | |
| 2018/0357440 A1* | 12/2018 | Brady | H04L 63/08 |
| 2019/0081809 A1* | 3/2019 | Ferren | H04L 12/2818 |
| 2020/0351265 A1* | 11/2020 | Srinath | H04N 7/152 |
| 2021/0073421 A1 | 3/2021 | Anderson et al. | |
| 2021/0150076 A1* | 5/2021 | Hinkle | G06F 21/31 |

* cited by examiner

*Primary Examiner* — Vance M Little
(74) *Attorney, Agent, or Firm* — Fish & Richardson P.C.

(57) ABSTRACT

The subject matter of this specification can be embodied in, among other things, a computer-implemented method for securing information in control centers, the method including receiving a first image of a first user, identifying, based on the received first image, a first authorization object indicative of one or more first security permissions of the first user, comparing the identified first authorization object to one or more security thresholds, and selectively displaying or suppressing first information on a display based on the comparing.

16 Claims, 7 Drawing Sheets

INFORMATION SECURITY THROUGH FACIAL RECOGNITION IN CONTROL CENTERS

TECHNICAL FIELD

The present disclosure applies to information security, more specifically security of displayed information.

BACKGROUND

Command and control centers often include large information displays or screens that are configured to be seen by many or all of the people in the room (e.g., a video wall). People within the room can observe the display from almost anywhere in the room in order to stay updated with regard to information that may be useful to their parts of the command and control operations taking place in the room.

Such control centers can be large and accommodate a large number of people, and the information shown on such control center displays can often include sensitive information. In such situations, a few basic options exist in order to ensure that sensitive information is not revealed to unauthorized persons. An example of one option is to stringently restrict access to the room to only those people who have authorization to see the most sensitive information that may ever be displayed, however such solutions highly restrict the movement of people with lower security authorizations yet still require access to the room (for example, custodians or support staff). Another option is to place permanent security caps on the information from being displayed, however such solutions can severely limit the overall usefulness of the display and may still not fully address the need for room access by people with very low or no security authorization (for example, visitors).

SUMMARY

The present disclosure describes techniques that can be used for securing information that is displayed in controlled spaces.

In an example implementation, a computer-implemented method for securing information in control centers, the method including receiving a first image of a first user, identifying, based on the received first image, a first authorization object indicative of one or more first security permissions of the first user, comparing the identified first authorization object to one or more security thresholds, and selectively displaying or suppressing first information on a display based on the comparing.

Various implementations can include some, all, or none of the following features. The computer-implemented method can include selectively suppressing the first information on the display based on the comparing, receiving a second image of the first user, identifying, based on the received second image, the first authorization object indicative of one or more first security permissions of the first user, comparing the identified first authorization object to one or more security thresholds, and selectively displaying the suppressed collection of information on a display based on the comparing. The computer-implemented method can include receiving a second image of a second user, different from the first user, identifying, based on the received second image, a second authorization object indicative of one or more second security permissions of the second user, comparing the identified first authorization object and the second authorization object to said one or more security thresholds, and selectively displaying or suppressing information on the display based on the comparing of the identified first authorization object and the second authorization object to said one or more security thresholds. The computer-implemented method can include updating a collection of authorization objects based on the identified first authorization object, wherein comparing the identified first authorization object to one or more security thresholds includes comparing the updated collection of authorization objects to one or more security thresholds. The computer-implemented method can include comparing the identified first authorization object to one or more other security thresholds, and selectively displaying or suppressing second information on the display, different from the first information, based on the comparing of the identified first authorization object to the one or more other security thresholds. The computer-implemented method can include determining a failure to identify the first authorization object, and notifying, based on the determining, an authorized user of the failure. The computer-implemented method can include selectively permitting or preventing physical access to a physical environment comprising the display based on the comparing.

An another example implementation, an information security system includes a facial recognition system configured to identify one or more users, a collection of authorization information configured to store and retrieve information descriptive of a collection of authorized users and one or more authorization objects assigned to each of the authorized users, an authorization system configured to identify a collection authorization objects for authorized users based on identified users and the collection of authorization information, and a display controller configured to selectively provide or suppress visual information for display by a display device based on a collection of authorization objects identified by the authorization system.

Various implementations can include some, all, or none of the following features. The information security system can include a physical environment including a perimeter defining a viewing area, the display, wherein the display is visible within the viewing area, and an image acquisition system configured to acquire facial information of users entering the viewing area and provide the acquired facial information to the facial recognition system. The image acquisition system can be configured to acquire facial information of users exiting the viewing area and provide the acquired facial information to the facial recognition system. The physical environment can include a defined entrance configured to permit entry through the perimeter, where the perimeter can be configured to prevent access by users to the viewing area. The facial recognition system can be configured to determine if users are entering or exiting the viewing area, and the authorization system can be configured to update the collection of authorization objects based on determinations of users who have entered the viewing area and determinations of users who have exited the viewing area. The display controller can include one or more display modules, each display module configured to display a subset of the visual information on a predetermined portion of the display and comprising a security listener module configured to receive authorization objects and perform one or more predetermined actions to modify display of the subset based on received authorization objects. Suppression of the visual information can include one or more of preventing the visual information from being transmitted to the display, modifying displayed information to become illegible, replacing the visual information with substitute visual information, and obfuscating the visual information.

In another example implementation, a non-transitory computer-readable medium storing instructions executable by a processing device to perform operations including receiving a first image of a first user, identifying, based on the received first image, a first authorization object indicative of one or more first security permissions of the first user, comparing the identified first authorization object to one or more security thresholds, and selectively displaying or suppressing first information on a display based on the comparing.

Various implementations can include some, all, or none of the following features. The operations can include selectively suppressing the first information on the display based on the comparing, receiving a second image of the first user, identifying, based on the received second image, the first authorization object indicative of one or more first security permissions of the first user, comparing the identified first authorization object to one or more security thresholds, and selectively displaying the suppressed collection of information on a display based on the comparing. The operations can include receiving a second image of a second user, different from the first user, identifying, based on the received second image, a second authorization object indicative of one or more second security permissions of the second user, comparing the identified first authorization object and the second authorization object to said one or more security thresholds, and selectively displaying or suppressing information on the display based on the comparing of the identified first authorization object and the second authorization object to said one or more security thresholds. The operations can include updating a collection of authorization objects based on the identified first authorization object, wherein comparing the identified first authorization object to one or more security thresholds includes comparing the updated collection of authorization objects to one or more security thresholds operations can include comparing the identified first authorization object to one or more other security thresholds, and selectively displaying or suppressing second information on the display, different from the first information, based on the comparing of the identified first authorization object to the one or more other security thresholds.

In another example, implementation, a method includes identifying a user, identifying security permissions of the identified user, and selectively displaying or suppressing first information on a display based on the identified security permissions.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, sensitive information can be kept secure. Second, the securing of sensitive information can be performed automatically. Third, the usefulness of a commonly-viewable display system can be improved.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques securing information that is displayed in controlled spaces. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, users can be identified before being granted access to a controlled space, such as a control room, in which sensitive information may be widely visible within the controlled space, such as information that is displayed on a video wall or other large display, or by one or more smaller displays distributed within the controlled space for viewing by substantially anyone within the controlled space. Prior to being allowed inside, the security clearances for the identified user are determined and compared to security levels associated with various information items being shown on the display. Any information items that are more sensitive than what the identified user is allowed to see are then suppressed from display before the identified user is allowed to enter the room and see the display.

Figure 1:
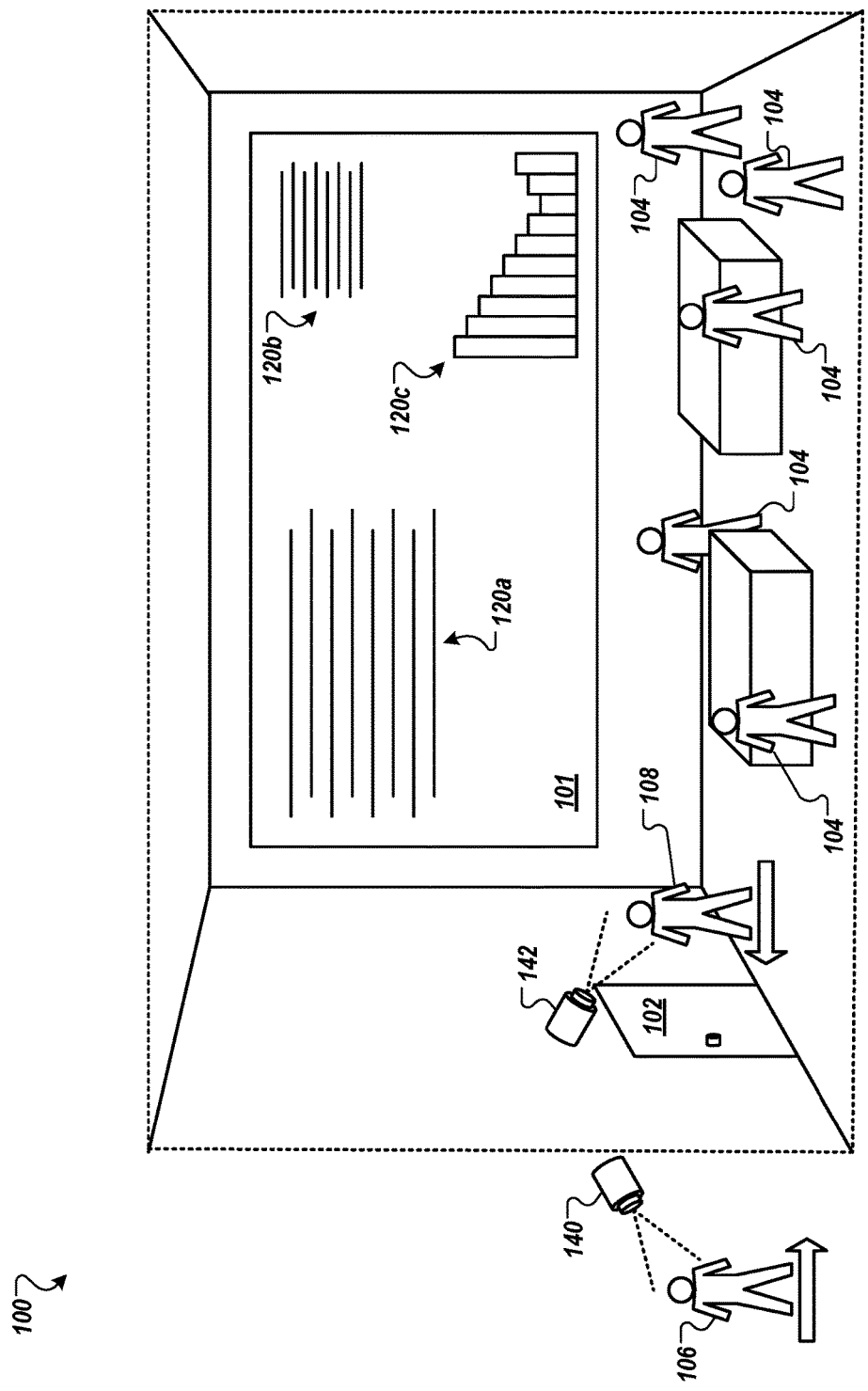
FIG. 1 is a schematic diagram that shows an example of a controlled space with an example public display.

FIG. 1 is a schematic diagram that shows an example of a controlled space 100 with an example public display 101. In the illustrated example, the controlled space 100 is depicted as an enclosed room (or other space having a defined perimeter) that defines a viewing area and has a door 102 (or other form of defined entrance), such as a control center, a boardroom, a classroom, conference room, or a lecture hall. In some implementations however, the controlled space can be any appropriate space, indoors or outdoors, to which physical access by people can be controlled. For example, the controlled space could be an outdoor space surrounded by a fence or natural boundaries and accessible at a controlled gateway, or could be an island surrounded by water and accessible by a controlled bridge or ferry. In yet another example, the controlled space could be space on or in a vehicle, such as an airplane or a boat.

In the illustrated example, the public display 101 is depicted as a large video screen or video wall that is visible to a number of users 104 and 108 occupying the controlled space 100. In some implementations, the public display 101 can be any appropriate form of display, such as one large screen or multiple smaller screens placed in various locations within the controlled space.

The public display 101 includes several collections of information 110 that can be viewed by the users 104, including a collection 120a, a collection 120b, and a collection 120c. In various implementations, the collections of information 120a-120c can include text, numbers, symbols, indicators, gauges, images, charts, animations, video, or combinations or these or any other appropriate form of visual display that can represent or convey information.

The collections of information 120a-120c are each assigned a corresponding level of security level that is based on the level of security, secrecy, sensitivity, confidentiality, or other appropriate factors of the information displayed within each of the collections of information 120a-120c. For example, the collection 120a may display highly sensitive information and may be assigned a relatively high security level, while the collection 120b may display information that is not considered to be sensitive and may be assigned a relatively low security level. In the illustrated example, all three of the collections of information 120a-120c are visible on the public display 101 because every one of the users 104 in the controlled space 100 has been verified to have a security clearance that meets or exceeds the security levels of each of the collections of information 120a-120c.

A user 106 is approaching the door 102 with the intent to enter the controlled space 100 where the public display 101 would be visible to the user 106. Before the user 106 enters the public space, a facial recognition system 140 (an image acquisition system) performs a facial recognition scan of the user 106. As will be discussed in more detail in the descriptions of FIGS. 2-6, the user 106 is identified, the security clearance of the user 106 is determined, and the security clearance of the user 106 is compared to the security levels of each of the collections of information 120a-120c. If the security level of one or more of the collections 120a, 120b, and 120c requires a higher security clearance than the user 106 has, then the overly sensitive ones of the collections of information 120a-120c are suppressed from the public display 101 before the user 106 is permitted to enter the controlled space 100.

The user 108, who is already within the controlled space 100, is approaching the door 102 with the intent to leave. A facial recognition system 142 (an image acquisition system) performs a facial recognition scan of the user 108. As will be discussed in more detail in the descriptions of FIGS. 2-6, the user 108 is identified, the security clearance of the user 108 is determined, and the security clearance of the user 108 is compared to the security levels of each of the collections of information 120a-120c. If one or more of the collections 120a, 120b, and 120c was previously suppressed because the user 108 had insufficient security privileges to view the suppressed information, then the security clearances of the users 104 remaining in the room are re-evaluated to determine a new lowest common security level, and one or more of the previously suppressed ones of the collections of information 120a-120c may be revealed on the public display 101 after the user 108 exits the controlled space 100.

Figure 2:
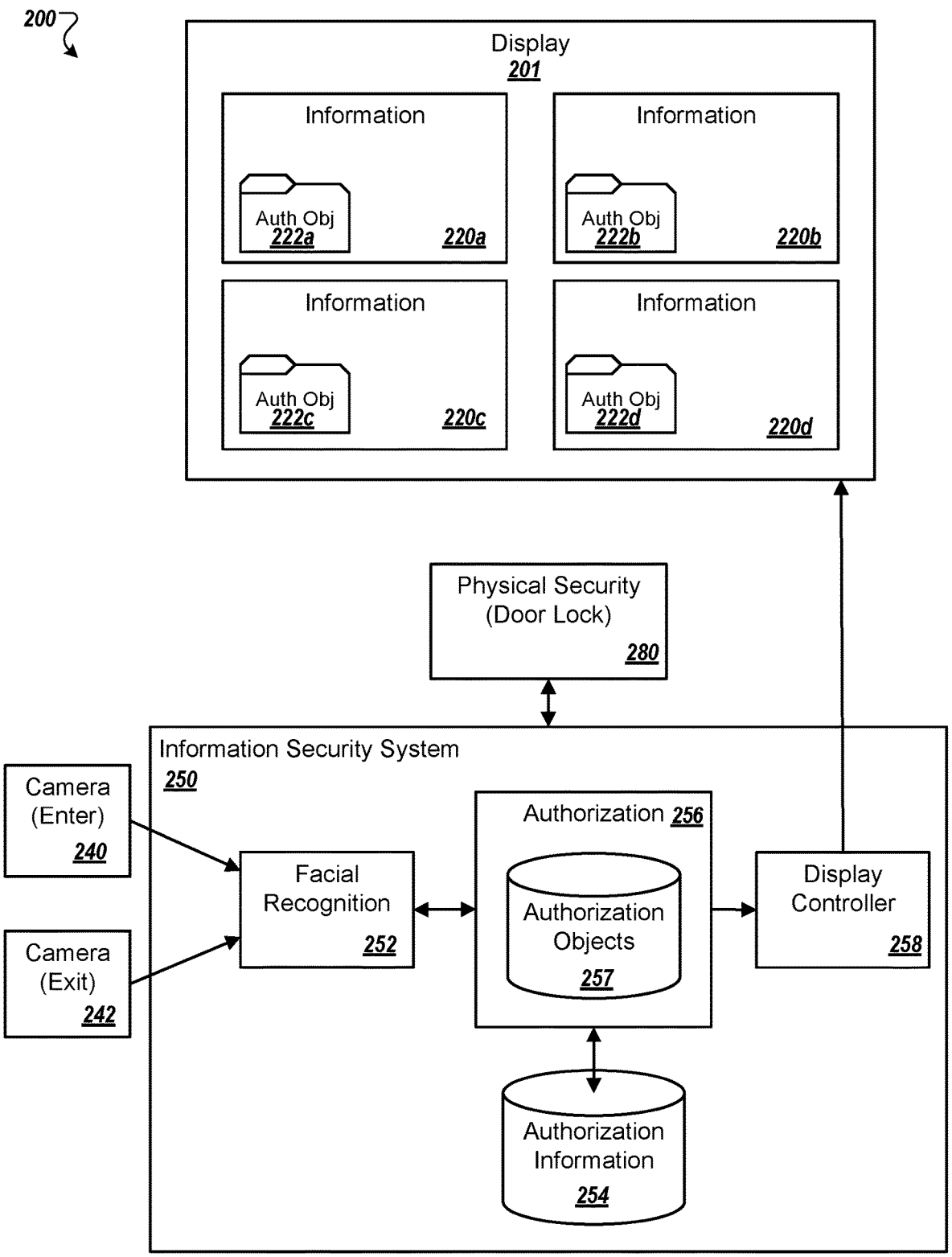
FIG. 2 is a block diagram that shows an example of a system for securing information for display.

FIG. 2 is a block diagram that shows an example of a system 200 for securing information for display. In some implementations, the system 200 can be used with the example controlled space 100 of FIG. 1.

The system 200 includes a display device 201. In some implementations, the display device 201 can be the example public display 101 of FIG. 1.

The system 200 also includes an information security system 250. The information security system 250 includes a facial recognition system 252 configured to identify one or more users, such as the example users 104, 106, and 107, based on images captured by a camera 240 and a camera 242. In some implementations, the camera 240 can be arranged at or near an entrance to a controlled space such as the example controlled space 100 in order to capture images of users who are approaching or attempting to enter the controlled space. In some implementations, the camera 242 can be arranged at or near an exit from a controlled space such as the example controlled space 100 in order to capture images of users who are leaving the controlled space.

The information security system 200 also includes a collection of authorization information 254 configured to store and retrieve information descriptive of a collection of authorized users and one or more authorization objects assigned to each of the authorized users. For example, the collection of authorization information 254 can be a database or other form of information repository in which information about users, user identifiers, and security levels or authorization levels granted to those users is stored.

The information security system 200 also includes an authorization system 256 configured to identify a collection authorization objects for authorized users based on identified users and the collection of authorization information. For example, the facial recognition system 252 can provide an identifier of a recognized user to the authorization system 256. The authorization system 256 can use the received identifier to perform a query of the collection of authorization information 254 to determine the recognized user's level of security authorization. The authorization system 256 is configured to combine the information retrieved about the recognized user and combine it with or otherwise compare it to a collection of authorization objects 257 that describe the security levels of all the users who are in the controlled space and could potentially view the display device 201.

The information security system 200 also includes a display module 258. The display module 258 is configured generate information for display on the display device 201, such as a collection of information 220a, a collection of information 220b, a collection of information 220c, and a collection of information 220d. Each of the collections of information 220a-220d has a corresponding authorization object 222a-222d. The authorization objects 222a-222d describe the level of security or authorization that a user would require in order to be granted access to the information in the corresponding authorization object 222a-222d.

For example, the information in the collection of information 220a may be relatively insensitive, such a news feed obtained from public sources, a delayed stock ticker, a clock, or a video feed of an unsecured location. As such, the level of authorization needed to view such information may be relatively low (or none), and the authorization object 222*a* can include information that categorizes the collection of information 220*a* as requiring users to have a relatively low (or no) predetermined level of security in order to view the content.

In another example, the information in the collection of information 220*b* may be moderately sensitive, such as a confidential internal news feed, a real time stock ticker, or a video feed of a secured location. As such, the level of authorization needed to view such information may be a mid-level security authorization, and the authorization object 222*b* can include information that categorizes the collection of information 220*b* as requiring users to have a predetermined moderate level of security in order to view the content.

In another example, the information in the collection of information 220*c* may be highly sensitive, such as a planning or predictive information, intelligence information, cryptographic keys, human resources information, or medical information. As such, the level of authorization needed to view such information may be a high-level security authorization, and the authorization object 222*c* can include information that categorizes the collection of information 220*c* as requiring users to have a predetermined high level of security in order to view the content.

In some implementations, the display module 258 can include one or a collection of software modules that produce information that can be interpreted for display as the collections of information 220*a*-220*d*. In some implementations, the display module 258 can include circuitry (for example, a computer video graphics card) that can generate video signals or data streams that can be received by the display device 201 and converted into visual displays of the collections of information 220*a*-220*d*.

The display module 258 is configured to selectively provide or suppress visual information for display by the display device 201 based on the collection of authorization objects 257 identified by the authorization system 256. For example, the display module 258 can receive information about the authorization objects 257 to determine a lowest level of authorization among the users who may be able to view the display device 201, and compare that information to the authorization objects 222*a*-222*d* to determine if one or more of the collections of information 220*a*-220*d* are more sensitive and require higher levels of authorization than what the lowest-authorized user in the vicinity is allowed to see. The display module 258 can react by suppressing the display of whichever ones of the collections of information 220*a*-220*d* exceed the authorization of the lowest-authorized user. The display module 258 will be discussed in more detail in the descriptions of FIGS. 3-6.

The system 200 also includes physical security system 280. The physical security system 280 is configured to exchange information with the authorization system 256. In some implementations, the physical security system 280 can include sensors or inputs (such as buttons, pressure pads, electric eyes, proximity detectors) that can trigger the authorization system 256 to process data from the facial recognition system 252. For example, a user can press a button to request entrance to a controlled space, and that button press can serve as a trigger to perform an update of the security objects and the collections of information 220*a*-220*d*, in order to differentiate the user from other users who may be passing by or near the camera 240 but do not intent to enter the controlled space. In some implementations, the physical security system 280 can include controllable locks, gates, or other forms of access control that can be triggered by the authorization system 256. For example, the physical security system 280 can keep a door to a controlled space locked until the information security system has successfully identified the requesting user, updated the collection of authorization objects 257, and updated the suppression statuses of the collections of information 220*a*-220*d* before unlocking the door and allowing the requesting user to enter into the vicinity of the display device 201.

Figure 3:
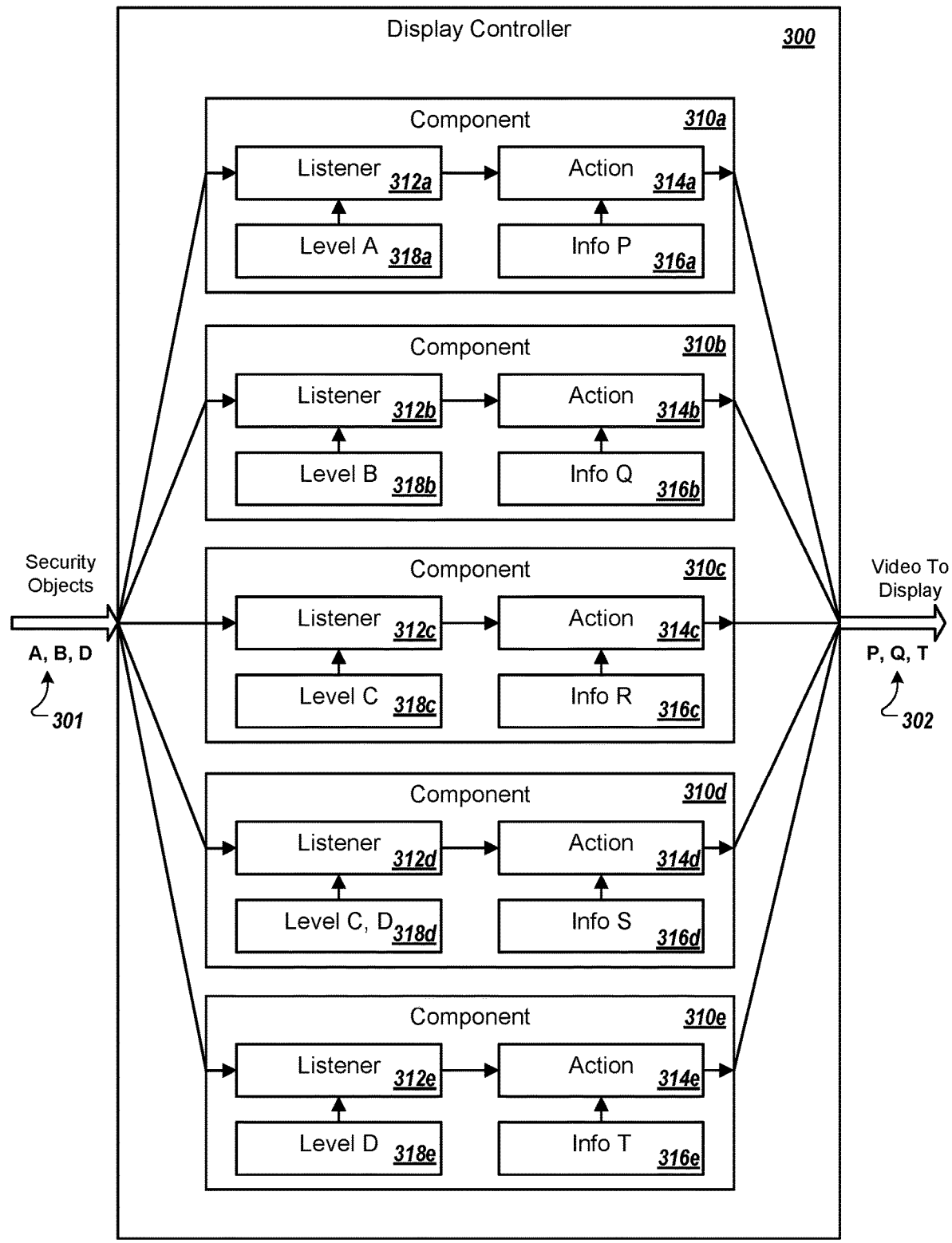
FIG. 3 is a block diagram of an example display controller.

FIG. 3 is a block diagram of an example display controller 300. In some implementations, the display controller 300 can be the example display module 258 of FIG. 2. The display controller 300 is configured to receive a collection of security objects 301, such as the example collection of authorization objects 257. The display controller 300 is configured provide video information 302 that has been modified based on the collection of security objects 301 and can be used to form an image on a display system, such as the example public display 101 of FIG. 1 or the example display device 201 of FIG. 2.

The display controller 300 includes a collection of display components 310*a*-310*e* (display modules). In some implementations, each of the display components 310*a*-310*e* can be configured to control the suppression or display of a collection of information having predetermined security level, based on the collection of security objects 301, and provide or suppress the information as part of the video information 302. For example, one of the display components 310*a*-310*e* may be configured to control the display or suppression of a block of insensitive text, while another of the display components 310*a*-310*e* may configured to display a video feed having a medium level of sensitivity, while yet another of the display components 310*a*-310*e* may be configured to display a bitmap image of highly sensitive information.

The display component 310*a* includes a security listener module 312*a* and an action module 314*a*. The action module is configured to control the display or suppression of a collection of information 316*a* (such as one or more of text, graphics, and video). The collection of information 316*a* is assigned a security level 318*a*. The security listener module 312*a* is configured to receive the security level 318*a* and respond if an incoming security object matches the security level 318*a*. In the illustrated example, the security level 318*a* is assigned a security level "A", and the collection of security objects 301 includes security objects "A", "B", and "D".

Since the collection of security objects 301 includes a security object "A", and the security listener module 312*a* is configured to listen for a security level "A", the security listener module 312*a* will respond by notifying the action module 314*a* that a match has been identified. In some implementations, the action module 314*a* can be configured to provide the collection of information 316*a* by default, and then suppress, block, blur, obfuscate, modify, or otherwise prevent the collection of information 316*a* from being provided as part of the video information 302 in response to an identified security match. In some implementations, the action module 314*a* can be configured to suppress, block, blur, obfuscate, modify, or otherwise prevent the collection of information 316*a* from being provided as part of the video information 302 by default, and then permit it to be displayed only in response to an identified security match.

In the illustrated example, the action module 314*a* is configured to suppress by default and permit passage only when an appropriate security object is detected. For example, the collection of information 316*a* includes information "P" which is classified by the security level 318a as requiring level "A" authorization. Since, in the illustrated example, the collection of security objects 301 (A, B, and D) includes a security object "A", the information "P" is permitted to become part of the video information 302 (P, Q, and T).

In some implementations, the security level 318a can be predetermined. For example, the security level of the collection of information 316a may be determined manually through a process of human evaluation. In another example, the security level of the collection of information 316a may be assumed based on its source, such as a video feed of an area in which sensitive operations may become visible, or a data feed that may provide sensitive details. In some implementations, the security level 318a may be determined automatically. For example, the collection of information 316a may be processed by a computer to identify keywords or to perform pattern recognition that can trigger an increase in the security level assigned to the information. In another example, machine learning or artificial intelligence can be used to process the collection of information 316a in order to dynamically determine a security level for the collection of information 316a as the information changes.

Each of the display components 310b-310e includes a corresponding one of security listener modules 312b-312e, action modules 314b-314e, collections of information 316b-316e, and security levels 318b-318e. In the illustrated example, the collection of information 316a includes the information "P" and has a security level 318a of "A", the collection of information 316b includes the information "Q" and has a security level 318b of "B", the collection of information 316c includes the information "R" and has a security level 318a of "C", the collection of information 316d includes the information "S" and has a security level 318d of "C" and "D", and the collection of information 316e includes the information "T" and has a security level 318e of "D".

With the security levels 318a-318e in place, when the display controller 300 receives the collection of security objects 301, the display components 310a-310e can listen for the presence of security objects of the collection of security objects 301 that match their respective security levels 318a-318e, and selectively provide or suppress their respective collections of information 316a-316e.

For example, in the illustrated embodiment, the collection of security objects 301 includes security objects "A", "B", and "D" that correspond to the security levels of users who have been identified as being present an a controlled space. In the illustrated example, the security listener module 312a can detect the security object "A" based on the security level 318a "A", and cause the action module 314a to provide the collection of information 316a "P" as part of the video information 302. In the illustrated example, the listener 312b can detect the security object "B" based on the security level 318b "B", and cause the action module 314b to provide the collection of information 316b "Q" as part of the video information 302. In the illustrated example, the listener 312e can detect the security object "D" based on the security level 318e "D", and cause the action module 314e to provide the collection of information 316e "T" as part of the video information 302.

In the illustrated example, the listener 312c is configured to react to the presence of security object "C", based on the security level 318c "C". However, since the collection of security objects 301 does not include a security object "C" (in this example), the action module 314c is not enabled to provide the collection of information 316c "R" as part of the video information 302. The collection of information 316c "R" is suppressed due to the absence of a corresponding security object.

In the illustrated example, the listener 312d is configured to react to the presence of two security objects "C" and "D", based on the security level 318d "C, D". However, even though the collection of security objects 301 includes a security object "D" (in this example), since the collection of security objects 301 does not also include a security object "C" (in this example), the action module 314d is not enabled to provide the collection of information 316d "S" as part of the video information 302. The collection of information 316d "S" is suppressed due to the absence of a corresponding security object "C".

Figure 4A:
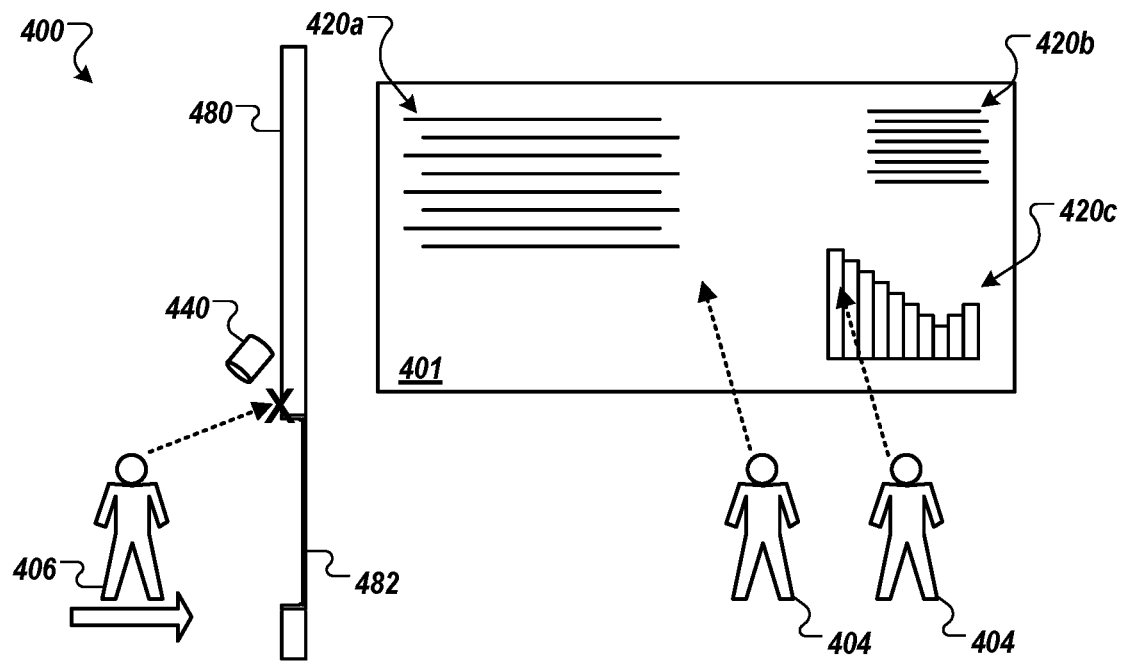
FIGS. 4A and 4B show conceptual examples of how information can be displayed, before and after an identified person enters a controlled space with an example public display.

FIG. 4A shows a conceptual example of how information can be displayed, before an identified person enters a controlled space 400 with an example public display 401, such as the example controlled space 100 with the example public display 101 of FIG. 1.

In the illustrated example, the public display 401 displays a collection of information 420a, a collection of information 420b, and a collection of information 420c. The collections of information 420a-420c each has its own requisite security level(s). In some implementations, the security level(s) may be pertain to and be applied to the entire content of the corresponding collection of information 420a-420c (such as an entire region of the public display 401, and entire block of text on the public display 401, or an entire image on the public display 401). In some implementations, the security level(s) may be pertain and be applied to subsets of the content of the corresponding collections of information 420a-420c (such as individual sentences, words, or phrases in a block of text on the public display 401, or sub-regions of an image on the public display 401, or subsets of data shown on the public display 401).

Several users 404, already in the controlled space 400 are known to have authorization to see collections of information 420a-420c. As such, in the illustrated example, all three of the collections of information 420a-420c are displayed without suppression.

A user 406 approaches the controlled space 400. The user 406 is prevented from seeing the public display 401 by a wall 480 (or other natural or artificial visual barrier) and a door 482 (or other controllable access gateway). A camera 440 is configured to capture an image of the face of the user 406 for facial recognition, security analysis, and modification of the information on the public display 401 (for example, by the example information security system 200 of FIG. 2).

Figure 4B:
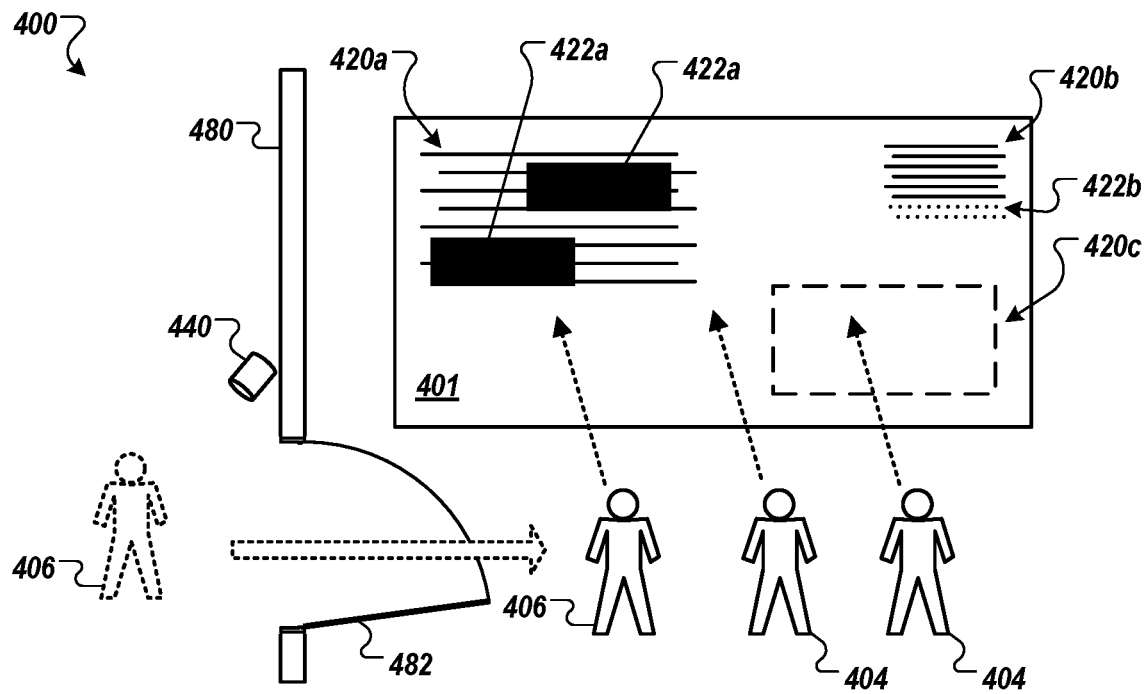

FIG. 4B shows a conceptual example of how information can be modified to accommodate an identified person who is attempting to enter the controlled space 400. In the illustrated example, the user 406 is identified and is determined as having sufficient security clearance to see some of the information on the public display 410, but insufficient security clearance to see all of the information on the public display 401.

Prior to the user 406 being granted physical access to the controlled space 400 (such as by unlocking the door 482), the collections of information 420a-420c are processed (for example, by the example display module 258 or 300 of FIGS. 2 and 3). In the illustrated example, the collection of information 420a is modified by hiding (such as by overlaying opaque masks) a collection of subsets of information 422a that include information that exceeds the security clearance of the user 406.

In the illustrated example, the collection of information 420b is modified by obfuscating (such as by blurring or scrambling or replacing with substitute visual information) a subset of information 422b that includes information that exceeds the security clearance of the user 406. In the illustrated example, the collection of information 420c is modified by hiding (such as by preventing the generation of video associated with) the entire collection of information 420c because it includes information that exceeds the security clearance of the user 406.

In the event that the user 406 were to exit the controlled space 400, the lower security clearance of the user 406 could be removed from the collection of security clearances present in the controlled space 400, restoring the security level back to that established by the user 404. As a result the subsets of information 422a and 422b, as well as the collection of information 420c, may be re-displayed.

Figure 5:
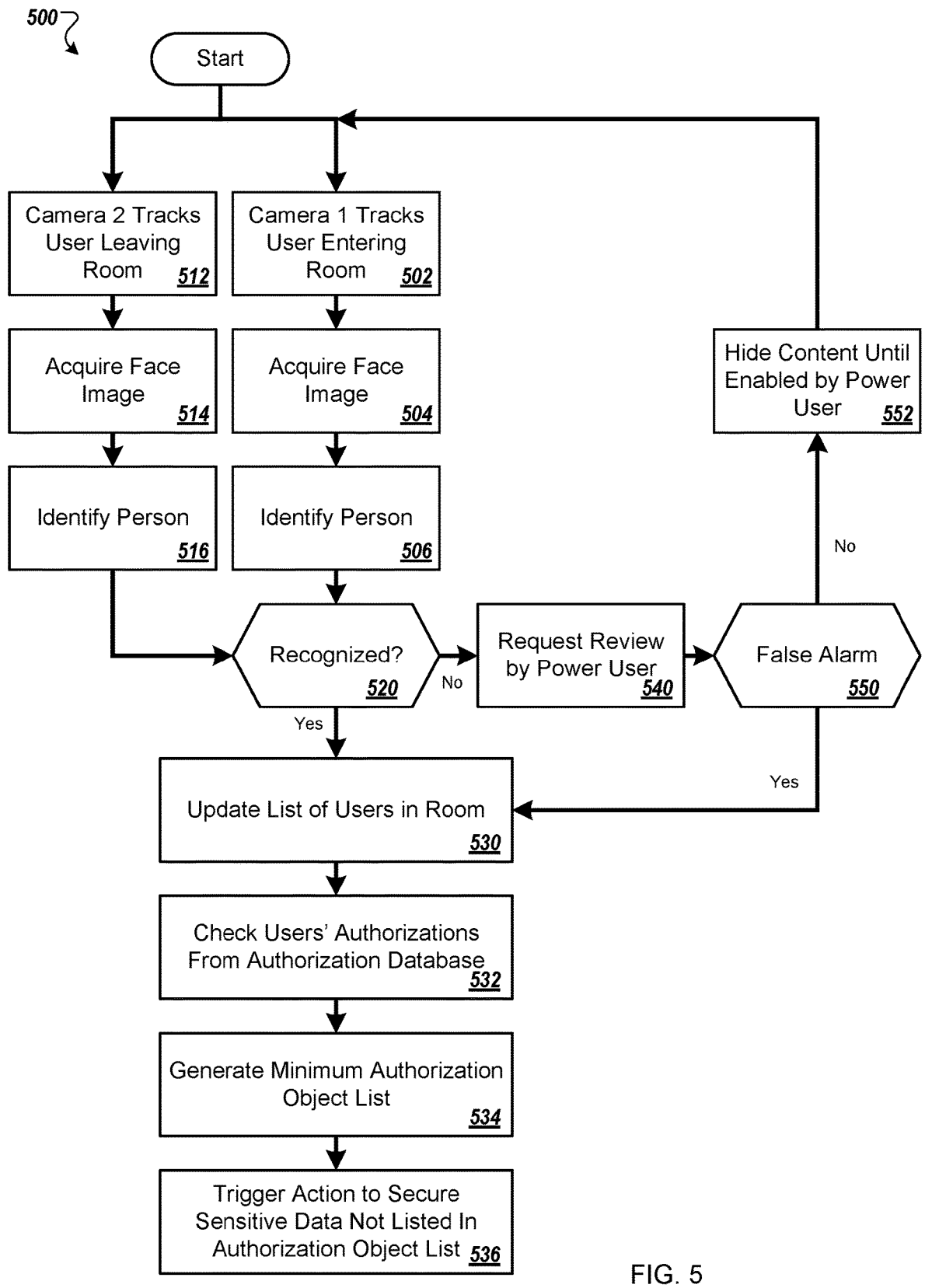
FIG. 5 is flow chart that shows an example of a process for securing information that is displayed in controlled spaces.

FIG. 5 is flow chart that shows an example of a process 500 for securing information that is displayed in controlled spaces, such as the example controlled space 100 of FIG. 1.

At 502, a camera tracks users entering a room, such as the controlled space 100. At 504, the entering person's face image is acquired, and at 506 the acquired facial information is used to identify the entering person.

At 512, a camera tracks users exiting the room. At 514, the entering person's face image is acquired, and at 516 the face image is used to identify the exiting person.

At 520, if the entering or exiting person is identified, then at 530 a list of users in the room is updated based on the entrance or exit of the identified user(s). For example, when a user is determined to be entering an occupied room, that user's identity is added to a list of other users who are already known to be in the room. When a user is determined to be exiting a room, that user's identity is removed from the list of users known to be in the room.

At 532, the authorizations of the users in the room are checked against or otherwise obtained from an authorization database. For example, for a room that has been determined to have 25 people in it, the security authorizations of the people listed in the list of room occupants can be queried from a database. In some implementations, the security clearances of just the entering users, just the exiting users, or some or all of the room occupants may be checked.

At 534, a minimum authorization object list is generated. For example, the security authorizations of all the occupants of the room can be analyzed to determine the lowest level(s) of security authorization that is common among all of the room occupants.

At 536, an action is triggered to secure sensitive data not listed in the authorization object list. For example, various collections of displayed data can each be associated with one or more security levels, and if one or more of the collections of data require authorization that requires more authorization than every room occupant has been granted, then the information is secured by suppressing, hiding, or otherwise preventing the display of such information in order to prevent it from being seen by the insufficiently authorized user(s).

At 520, if the entering or exiting person not identified, then at 540 a power user is requested to perform an authorization review. At 550, if the review determines that the failed recognition is a false alarm, then the power user can clear the alarm and update the list of users in the room at 530. For example, the facial recognition system may fail to recognize a known authorized user because of a change in eyewear, an unusual facial expression, a facial bandage, or other visual changes that might confuse a facial recognition system, and the power user can manually identify the user and override the failed recognition. In another example, the entering user may be a visitor who is not in the recognition system but is otherwise known (by the power user) to be authorized to see all of the information that is currently visible, and the power user can perform can perform a manual override to admit the authorized visitor.

At 550, if the review determines that the failed recognition is not false alarm, then at 552 the content can be hidden until enabled by the power user. For example, the entering user may not have an entry in the facial recognition system or the authorization database, and the power user can be prompted to remedy the problem (by entering the new user into the system, and returning to step 502). In another example, the entering users may be a tour group of visitors having zero or unknown security clearances, and the power user may manually cause the public display to suppress everything but the most insensitive information (or replace the sensitive information with insensitive simulated information) for the duration of the tour.

Figure 6:
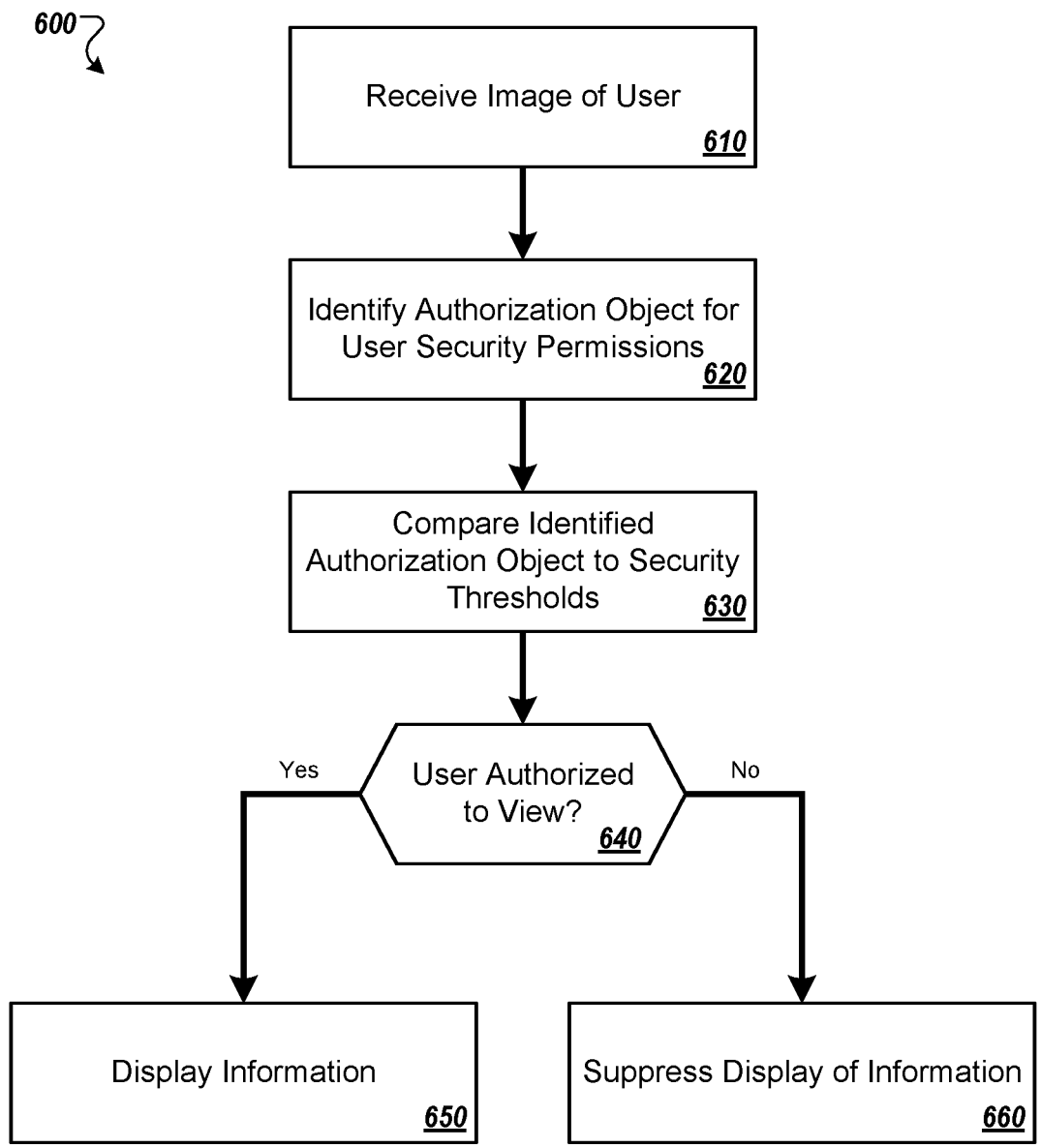
FIG. 6 is flow chart that shows an example of a process for securing information that is displayed in controlled spaces.

FIG. 6 is flow chart that shows an example of a process 600 for securing information that is displayed in controlled spaces according to some implementations of the present disclosure. In some implementations, the process 600 can be performed by part or all of the example system 200 of FIG. 2, for example, to control the display of information in the example controlled space 100 of FIG. 1. For clarity of presentation, the description that follows generally describes the process 600 in the context of the other figures in this description. However, it will be understood that the process 600 can be performed, for example, by any suitable system, environment, software, and hardware, or a combination of systems, environments, software, and hardware, as appropriate. In some implementations, various steps of the process 600 can be run in parallel, in combination, in loops, or in any order.

At 610, a first image of a first user is received. For example, the example camera 240 or 242 can capture an image of a user's face.

At 620, a first authorization object indicative of one or more first security permissions of the first user is identified based on the received first image. For example, the example facial recognition system 252 can identify the user and the authorization system 256 can query the authorization information 254 to determine one or more security objects (security authorizations, clearances, levels) granted to the user.

At 630, the identified first authorization object is compared to one or more security thresholds. For example, the display module 258 can compare the security permissions of the identified user against one or more security levels associated with data that is (or will be) shown on the example public display 101.

At 640, a determination is made based on the comparing. If the identified user has the appropriate authorization objects to see a collection of information, then at 650 that information is displayed a display (such as the public display 101). If the identified user does not have the appropriate authorization objects to see a collection of information, then at 660 that information is suppressed from being displayed (such as the example suppressed subsets of information 422a-422b, or the example suppressed collection of information 420c of FIG. 4B).

In some implementations, the process 600 can include selectively suppressing the first information on the display based on the comparing, receiving a second image of the first user, identifying, based on the received second image, the first authorization object indicative of one or more first security permissions of the first user, comparing the identified first authorization object to one or more security thresholds, and selectively displaying the suppressed collection of information on a display based on the comparing. For example, the example camera 242 may be used by the information security system 250 to determine that an unauthorized person is leaving a controlled space, and respond by revealing information that was previously hidden due to the exiting user's presence within view of the public display 201.

In some implementations, the process 600 can also include receiving a second image of a second user, different from the first user, identifying, based on the received second image, a second authorization object indicative of one or more second security permissions of the second user, comparing the identified first authorization object and the second authorization object to said one or more security thresholds, and selectively displaying or suppressing information on the display based on the comparing of the identified first authorization object and the second authorization object to said one or more security thresholds. For example, for each person who enters the example controlled space 100, the example system 250 can re-evaluate whether to selectively display or suppress various collections of information on the example public display 201.

In some implementations, the process 600 can include updating a collection of authorization objects based on the identified first authorization object, where comparing the identified first authorization object to one or more security thresholds can include comparing the updated collection of authorization objects to one or more security thresholds. For example, for each person who enters the example controlled space 100, the example system 250 can add those persons authorizations to the collection of authorization objects 257, and the display module 258 can selectively display and suppress various collections of information based on the lowest common authorization in the room, as identified by the collection of authorization objects 257.

In some implementations, the process 600 can include comparing the identified first authorization object to one or more other security thresholds, and selectively displaying or suppressing second information on the display, different from the first information, based on the comparing of the identified first authorization object to the one or more other security thresholds. For example, each of the example collections of information 316*a*-316*e* can be associated with a corresponding one of the example security levels 318*a*-318*e*, and each of the example action modules 314*a*-314*e* can selectively provide or suppress their respective collection of information 316*a*-316*e* based on the security levels 318*a*-318*e* and the example security objects 301.

In some implementations, the process 600 can include determining a failure to identify the first authorization object, and notifying, based on the determining, an authorized user of the failure. For example, if the user is not recognized at example step 520 of the process 500, then a request for review by a power user can be sent at example step 540.

In some implementations, the process 600 can include selectively permitting or preventing physical access to a physical environment comprising the display based on the comparing. For example, the example information security system 250 can control the physical security system 280 to keep the example controlled space 100 secure (such as by locking the door 102), and then temporarily unsecuring the controlled space 100 (such as by momentarily unlocking the door 102) after the example user 106 has been recognized and identified for security purposes, and the public display 101 has been updated to suppress sensitive information based on the collective authorizations of the users 104, 106, and 108.

While the examples in this document mainly describe the use of facial recognition as a method for identifying users in order to selectively display and suppress various collections of information, any appropriate form (or combination of forms) of identification can be used. For example, any appropriate form of biometric identification such as fingerprint scanning, retinal scanning, voice matching, or combinations of these or any other biometric identification method can be used in conjunction with, or in place of, facial recognition. In another example, access cards, proximity (RFID) tags, PIN codes, passwords, or any other appropriate form of non-biometric identification can be used alone or in any appropriate combination of non-biometric and biometric identification. In another example, identification may be performed manually, such as by a security guard.

Figure 7:
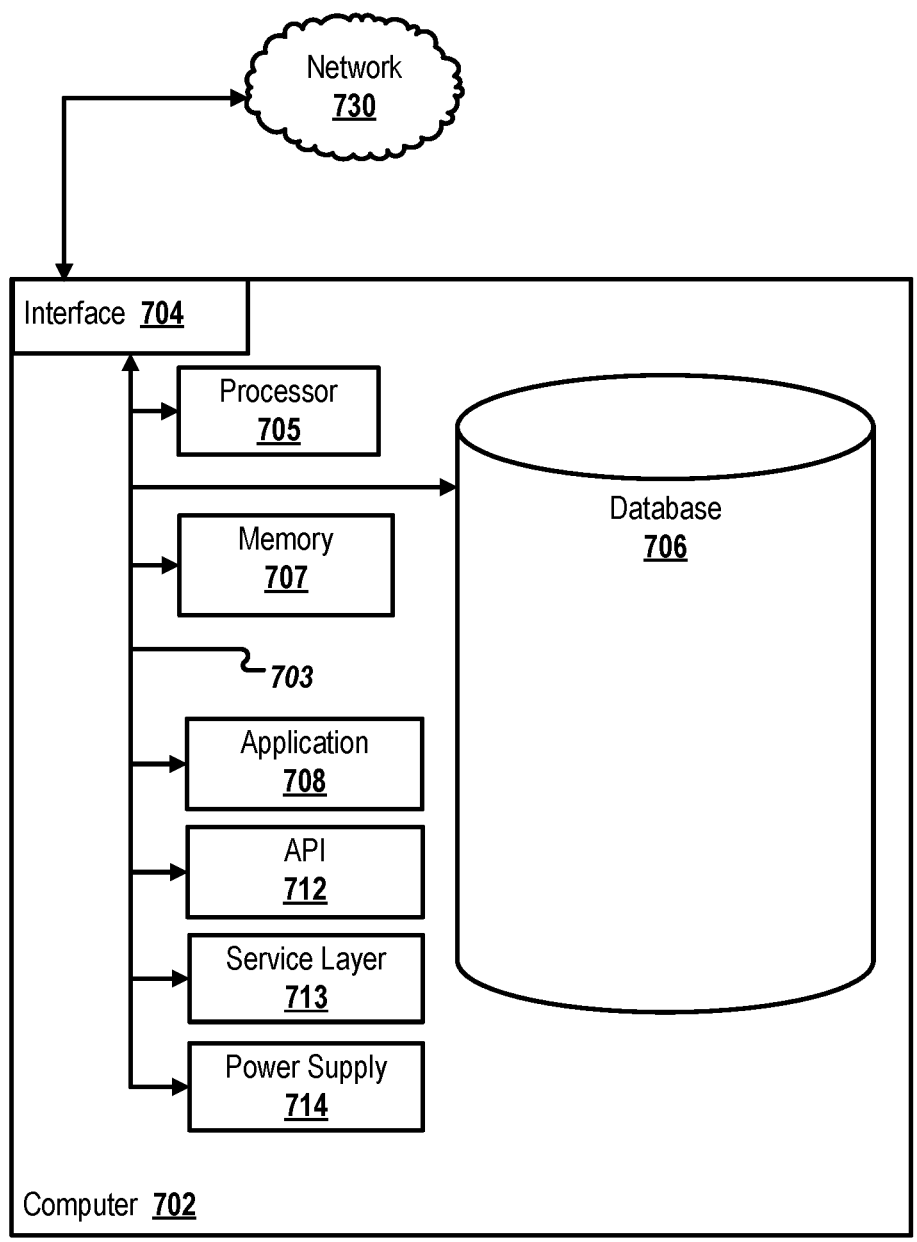
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a top level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both) over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a computer-implemented method for securing information in control centers includes receiving a first image of a first user, identifying, based on the received first image, a first authorization object indicative of one or more first security permissions of the first user, comparing the identified first authorization object to one or more security thresholds, and selectively displaying or suppressing first information on a display based on the comparing.

The foregoing and other described implementations can each, optionally, include one or more of the following features:

A first feature, combinable with any of the following features, the computer-implemented method further including selectively suppressing the first information on the display based on the comparing, receiving a second image of the first user, identifying, based on the received second image, the first authorization object indicative of one or more first security permissions of the first user, comparing the identified first authorization object to one or more security thresholds, and selectively displaying the suppressed collection of information on a display based on the comparing.

A second feature, combinable with any of the following features, the computer-implemented method further including receiving a second image of a second user, different from the first user, identifying, based on the received second image, a second authorization object indicative of one or more second security permissions of the second user, comparing the identified first authorization object and the second authorization object to said one or more security thresholds, and selectively displaying or suppressing information on the display based on the comparing of the identified first authorization object and the second authorization object to said one or more security thresholds.

A third feature, combinable with any of the following features, the computer-implemented method further including updating a collection of authorization objects based on the identified first authorization object, where comparing the identified first authorization object to one or more security thresholds includes comparing the updated collection of authorization objects to one or more security thresholds.

A fourth feature, combinable with any of the following features, the computer-implemented method further including comparing the identified first authorization object to one or more other security thresholds, and selectively displaying or suppressing second information on the display, different from the first information, based on the comparing of the identified first authorization object to the one or more other security thresholds.

A fifth feature, combinable with any of the following features, the computer-implemented method further including determining a failure to identify the first authorization object, and notifying, based on the determining, an authorized user of the failure.

A sixth feature, combinable with any of the following features, the computer-implemented method further including selectively permitting or preventing physical access to a physical environment comprising the display based on the comparing.

In a second implementation, an information security system includes a facial recognition system configured to identify one or more users, a collection of authorization information configured to store and retrieve information descriptive of a collection of authorized users and one or more authorization objects assigned to each of the authorized users, an authorization system configured to identify a collection authorization objects for authorized users based on identified users and the collection of authorization information, and a display controller configured to selectively provide or suppress visual information for display by a display device based on a collection of authorization objects identified by the authorization system.

The foregoing and other described implementations can each, optionally, include one or more of the following features:

A first feature, combinable with any of the following features, the information security system further includes a physical environment including a perimeter defining a viewing area, the display, wherein the display is visible within the viewing area, and an image acquisition system configured to acquire facial information of users entering the viewing area and provide the acquired facial information to the facial recognition system.

A second feature, combinable with any of the following features, the information security system is further configured to acquire facial information of users exiting the viewing area and provide the acquired facial information to the facial recognition system.

A third feature, combinable with any of the following features, the information security system where the physical environment further includes a defined entrance configured to permit entry through the perimeter, wherein the perimeter is configured to prevent access by users to the viewing area.

A fourth feature, combinable with any of the following features, the information security system where the facial recognition system is further configured to determine if users are entering or exiting the viewing area, and the authorization system is configured to update the collection of authorization objects based on determinations of users who have entered the viewing area and determinations of users who have exited the viewing area.

A fifth feature, combinable with any of the following features, the information security system where the display controller includes one or more display modules, each display module configured to display a subset of the visual information on a predetermined portion of the display and comprising a security listener module configured to receive authorization objects and perform one or more predetermined actions to modify display of the subset based on received authorization objects.

A sixth feature, combinable with any of the following features, the information security system further where suppression of the visual information can include one or more of preventing the visual information from being transmitted to the display, modifying displayed information to become illegible, replacing the visual information with substitute visual information, and obfuscating the visual information.

In a third implementation, a non-transitory computer-readable medium storing instructions executable by a processing device to perform operations including receiving a first image of a first user, identifying, based on the received first image, a first authorization object indicative of one or more first security permissions of the first user, comparing the identified first authorization object to one or more security thresholds, and selectively displaying or suppressing first information on a display based on the comparing.

The foregoing and other described implementations can each, optionally, include one or more of the following features:

A first feature, combinable with any of the following features, the operations further including selectively suppressing the first information on the display based on the comparing, receiving a second image of the first user, identifying, based on the received second image, the first authorization object indicative of one or more first security permissions of the first user, comparing the identified first authorization object to one or more security thresholds, and selectively displaying the suppressed collection of information on a display based on the comparing.

A second feature, combinable with any of the following features, the operations further including receiving a second image of a second user, different from the first user, identifying, based on the received second image, a second authorization object indicative of one or more second security permissions of the second user, comparing the identified first authorization object and the second authorization object to said one or more security thresholds, and selectively displaying or suppressing information on the display based on the comparing of the identified first authorization object and the second authorization object to said one or more security thresholds.

A third feature, combinable with any of the following features, the operations further including updating a collection of authorization objects based on the identified first authorization object, wherein comparing the identified first authorization object to one or more security thresholds includes comparing the updated collection of authorization objects to one or more security thresholds.

A fourth feature, combinable with any of the following features, the operations further including comparing the identified first authorization object to one or more other security thresholds, and selectively displaying or suppressing second information on the display, different from the first information, based on the comparing of the identified first authorization object to the one or more other security thresholds.

In a fourth implementation, a method includes identifying a user, identifying security permissions of the identified user, and selectively displaying or suppressing first information on a display based on the identified security permissions.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or 10S.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some, or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method for securing information in control centers, the computer-implemented method comprising:
   receiving, by an information security system, first information;
   determining, by the information security system, a first security threshold of the first information based on the first information;
   assigning, by the information security system, the first security threshold to the first information;
   receiving, by the information security system, second information, different from the first information;
   determining, by the information security system and based on the second information, a second security threshold of the second information, different from the first security threshold;
   assigning, by the information security system, the second security threshold to the second information;
   locking, by the information security system, a door that provides access to a controlled space comprising a physical environment comprising a display;
   receiving, by the information security system and from an image sensor arranged outside of the physical environment, a first image of a first user proximal to the door;
   identifying, by the information security system, based on the first image, a first authorization object indicative of one or more first security permissions of the first user;
   determining a security clearance level of the first user by comparing, by the information security system, the first authorization object to the first security threshold and the second security threshold;
   determining, by the information security system and based on the comparing, that the first user is authorized to enter the physical environment;
   preventing, by the information security system, a generation of displayable data associated with the first information, before unlocking the door providing access to the controlled space, based on the security clearance level of the first user;
   selectively displaying, by the information security system, before unlocking the door providing access to the controlled space, the second information on a second portion of the display within the controlled space, different from a first portion of the display, based on the security clearance level of the first user; and
   unlocking, by the information security system, the door to selectively permit the first user to access the physical environment after preventing the generation of displayable data based on the security clearance level of the first user.

2. The computer-implemented method of claim 1, further comprising:
   receiving a second image of the first user;
   identifying, based on the second image, the first authorization object indicative of one or more first security permissions of the first user;
   comparing the first authorization object to one or more security thresholds; and
   selectively displaying the first information on the display based on the comparing security clearance level of the first user.

3. The computer-implemented method of claim 1, further comprising:
   receiving a second image of a second user, different from the first user;
   identifying, based on the second image, a second authorization object indicative of one or more second security permissions of the second user;
   comparing the first authorization object and the second authorization object to one or more security thresholds; and
   selectively displaying or suppressing third information on the display based on the comparing of the first authorization object and the second authorization object to the one or more security thresholds.

4. The computer-implemented method of claim 1, further comprising updating a collection of authorization objects based on the first authorization object, wherein comparing the first authorization object to one or more security thresholds comprises comparing the collection of authorization objects to one or more security thresholds.

5. The computer-implemented method of claim 1, further comprising:
   comparing the first authorization object to one or more other security thresholds; and
   selectively displaying or suppressing the second information on the display based on the comparing of the first authorization object to the one or more other security thresholds.

6. The computer-implemented method of claim 1, further comprising:
   determining a failure to identify the first authorization object; and
   notifying, based on the determining, an authorized user of the failure.

7. An information security system comprising:
   a physical environment comprising:
      a perimeter defining a viewing area configured to be occupied by one or more users;
      a defined entrance configured to permit entry through the perimeter, wherein the perimeter is configured to prevent access by users to the viewing area; and
      a display configured to be visible within the viewing area;
   a facial recognition system configured to identify one or more users;
   an image acquisition system configured to acquire facial information of users entering the viewing area and provide the acquired facial information to the facial recognition system;
   an authorization system configured to:
      receive first information;
      receive second information different from the first information;

determine, by the authorization system, a first security threshold of the first information based on the first information;

determine, by the authorization system and based on the second information, a second security threshold of the second information, different from the first security threshold;

store, by the authorization system, the first security threshold and the second security threshold in a collection of information descriptive of a collection of authorized users and one or more authorization objects assigned to each of the authorized users;

lock the defined entrance;

receive, from an image sensor arranged outside of the physical environment, a first image of a first user proximal to the defined entrance;

identify, based on the first image, a first authorization object indicative of one or more first security permissions of the first user;

determine a security clearance level of the first user by comparing the first authorization object to one or more security thresholds; and determine, based on the comparing, that the first user is authorized to enter the physical environment; and a display controller configured to:

prevent a generation of displayable data associated with the first information, before unlocking the defined entrance providing access to the physical environment based on the security clearance level of the first user; and selectively display, before unlocking the defined entrance providing access to the physical environment, second visual information, different from first displayable data and based on the second information, on a second portion of the display, different from a first portion of the display, based on the security clearance level of the first user, wherein the authorization system is further configured to unlock the defined entrance to selectively permit the first user to access a controlled space comprising the physical environment after preventing the generation of displayable data based on the security clearance level of the first user.

8. The information security system of claim 7, wherein:

the facial recognition system is further configured to determine if users are entering or exiting the viewing area; and the authorization system is configured to update the collection of authorization objects based on determinations of users who have entered the viewing area and determinations of users who have exited the viewing area.

9. The information security system of claim 7, wherein the display controller comprises one or more display modules, each display module configured to display a subset of the first information on a predetermined portion of the display and comprising a security listener module configured to receive authorization objects and perform one or more predetermined actions to modify display of the subset based on authorization objects.

10. The information security system of claim 7, wherein suppression of the first information can comprise one or more of preventing the first information from being transmitted to the display, modifying displayed information to become illegible, replacing the first information with substitute visual information, and obfuscating the first information.

11. A non-transitory computer-readable medium storing instructions executable by a processing device to perform operations comprising:

receiving, by the processing device, first information;

determining, by an information security system, a first security threshold of the first information based on the first information;

assigning, by the information security system, the first security threshold to the first information;

receiving, by the information security system, second information, different from the first information;

determining, by the information security system and based on the second information, a second security threshold of the second information, different from the first security threshold;

assigning, by the information security system, the second security threshold to the second information;

locking, by the information security system, a door that provides access to a controlled space comprising a physical environment comprising a display;

receiving, by the information security system and from an image sensor arranged outside of the physical environment, a first image of a first user proximal to the door;

identifying, by the information security system, based on the first image, a first authorization object indicative of one or more first security permissions of the first user;

determining a security clearance level of the first user by comparing, by the information security system, the first authorization object to the first security threshold and the second security threshold;

determining, by the information security system and based on the comparing, that the first user is authorized to enter the physical environment;

preventing, by the information security system, a generation of displayable data associated with the first information, before unlocking the door providing access to the controlled space, based on the security clearance level of the first user;

selectively displaying, by the information security system, before unlocking the door providing access to the controlled space, the second information on a second portion of the display within the controlled space, different from a first portion of the display, based on the security clearance level of the first user; and unlocking, by the information security system, the door to selectively permit the first user to access the physical environment after the first information on the display has been selectively suppressed based on the security clearance level of the first user.

12. The non-transitory computer-readable medium of claim 11, the operations further comprising:

receiving a second image of the first user;

identifying, based on the second image, the first authorization object indicative of one or more first security permissions of the first user;

comparing the first authorization object to one or more security thresholds; and selectively displaying the first information on the display based on the security clearance level of the first user.

13. The non-transitory computer-readable medium of claim 11, the operations further comprising:

receiving a second image of a second user, different from the first user;

identifying, based on the second image, a second authorization object indicative of one or more second security permissions of the second user;

comparing the first authorization object and the second authorization object to one or more security thresholds; and selectively displaying or suppressing third information on the display based on the comparing of the first authorization object and the second authorization object to the one or more security thresholds.

14. The non-transitory computer-readable medium of claim 11, the operations further comprising updating a collection of authorization objects based on the first authorization object, wherein comparing the first authorization object to one or more security thresholds comprises comparing the collection of the authorization objects to the one or more security thresholds.

15. The non-transitory computer-readable medium of claim 11, the operations further comprising:
   comparing the first authorization object to one or more other security thresholds; and
   selectively displaying or suppressing the second information on the display based on the comparing of the first authorization object to the one or more other security thresholds.

16. A method comprising:
   receiving, by an information security system, first information;
   determining, by the information security system, a first security threshold of the first information based on the first information;
   assigning, by the information security system, the first security threshold to the first information;
   receiving, by the information security system, second information, different from the first information;
   determining, by the information security system and based on the second information, a second security threshold of the second information, different from the first security threshold;
   assigning, by the information security system, the second security threshold to the second information;
   locking a door that provides access to a controlled space comprising a physical environment comprising a display;
   identifying a user, based on an image of the user proximal to the door, from an image sensor arranged outside of the physical environment;
   identifying security permissions of the user;
   determining a security clearance level of the user by comparing the security permissions to the first security threshold and the second security threshold;
   preventing a generation of displayable data associated with the first information, before unlocking the door providing access to the controlled space, based on the security permissions and based on the security clearance level of the user;
   selectively displaying before unlocking the door providing access to the controlled space, the second information on a second portion of the display within the controlled space, different from a first portion of the display, based on the comparing; and
   unlocking the door to selectively permit the user to access the physical environment after the first information on the display has been selectively suppressed based on the security clearance level of the user.

* * * * *